3,010,367
OPTICAL SIGHTING LENS SYSTEMS
John R. Miles, Glenview, Ill., assignor, by mesne assignments, to Chicago Aerial Industries, Inc., Melrose Park, Ill., a corporation of Delaware
Filed Dec. 7, 1956, Ser. No. 626,856
8 Claims. (Cl. 88—57)

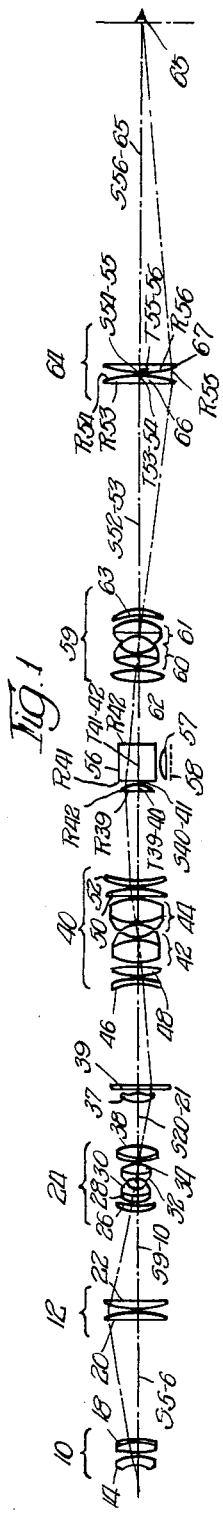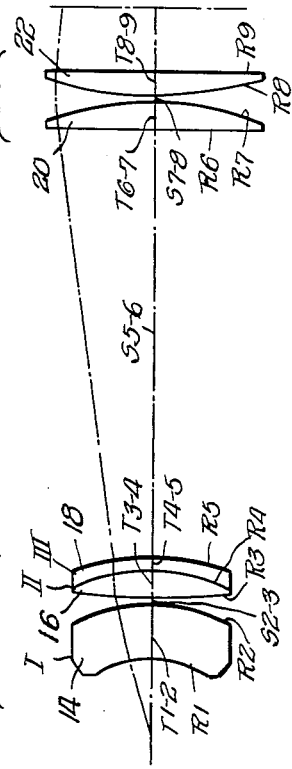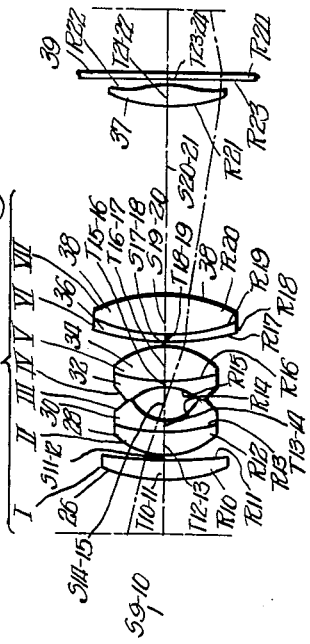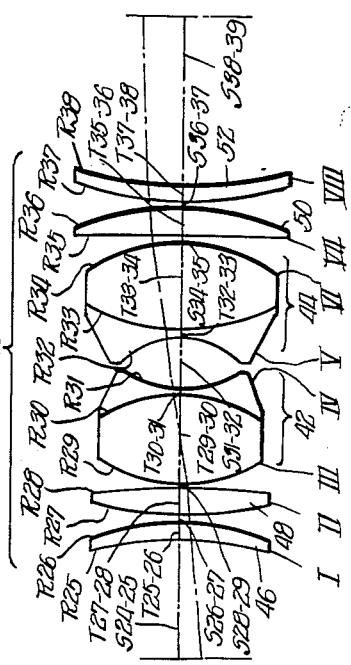

This invention relates to optical sighting systems and more particularly to systems of the periscope type, such as a large exit pupil viewfinder, for example. Such systems are of increasing usefulness as equipment for modern aircraft, and particularly military aircraft where the field of view of the occupants is rather severely limited by the configuration of the fuselage designed for very high speed travel.

Such equipment, to be of maximum utility, must permit the image formed by the instrument to be viewed with both eyes of the observer. Likewise, a substantial amount of lateral head movement must be possible without encountering undesirable distortion of the image. Various means have been utilized in prior art devices to provide a substantial amount of lateral head movement such as the use of a beamsplitting means to produce two exit pupils, one for each eye. In the present invention, however, a single relatively large exit pupil is provided that is capable of accommodating both eyes of the observer.

The use of a single exit pupil causes the eyes of the observer to be disposed on opposite sides of the exit pupil rather than in the center thereof. This unsymmetrical condition makes it necessary to have a highly corrected system in order to avoid parallax and differential distortion, or "swelling" of the image when the head of the observer is moved laterally.

Systems incorporating the present invention provide a pleasant, realistic, substantially distortion free image and have a greater utility than any prior art sighting device of this general character.

This present application is a continuation-in-part of applicant's co-pending application Serial No. 616,258, filed October 16, 1956, now Patent No. 2,893,290, and entitled "Optical Sighting Lens Systems." In that previously filed application the invention disclosed is embodied in a wide angle, rather than a narrow angle, large exit pupil viewfinder, as in the present instance. Certain components of the two systems may be identical and therefore, in some instances it will be desirable to have a combined system which incorporates both the narrow and wide angle viewfinders into one assembly with suitable means being provided for selectively making operable the wide angle or narrow angle components of the systems at will. Such an arrangement is possible since the two systems differ only in the components which are disposed ahead of the reticle aspheric field lens.

It is, therefore, an object of this invention to provide a narrow angle large exit pupil viewfinder particularly suited for use in aircraft which permits a substantial amount of lateral head movement of the observer without substantial distortion of the image.

It is also an object to provide such a narrow angle viewfinder which can readily be incorporated as a selectable component in a combined wide and narrow angle system.

It is also an object to provide such a system having a plurality of novel elements among which are the objective assembly, the first erector assembly, and the reticle aspheric field lens.

Further objects and advantages of this invention will become evident as the description proceeds and from an examination of the accompanying drawing which illustrates one embodiment of the invention and in which similar numerals refer to similar parts throughout the several views.

In the drawings:
FIGURE 1 is a somewhat diagrammatic representation of a narrow angle large exit pupil viewfinder system according to the invention.
FIGURE 2 is an enlarged view of a portion of the viewfinder of FIGURE 1 illustrating the narrow angle objective assembly and its associated field lenses in greater detail.
FIGURE 3 is an enlarged view of a portion of the viewfinder of FIGURE 1 showing the first erector assembly, the reticle aspheric lens and the reticle in greater detail.
FIGURE 4 is an enlarged view of a portion of the viewfinder of FIGURE 1 showing the second erector assembly in greater detail.
FIGURE 5 is an enlarged view of a portion of the viewfinder of FIGURE 1 showing the third erector in greater detail.

As previously stated, a number of novel elements have been incorporated in the narrow angle system disclosed in the drawing among which is a narrow angle objective that is substantially corrected for all of the major aberrations except distortion. This narrow angle objective comprises a thick meniscus shaped front lens having a concave first surface and a convex second surface. This lens is followed by a doublet lens comprising the first lens which is convex on the first surface and convex on the second surface, and a second lens which is concave on the first surface and convex on the second surface. The objective assembly is, therefore, a single Gaussian objective (normally defined as an objective which is composed of a meniscus component or element followed by an element or component with positive power).

The aperture stop of this objective is located in front of its first surface which aperture stop aids substantially in correcting the field curvature and astigmatism. This location of the aperture stop also makes the complete instrument more useful by requiring a minimum size window opening at the front. The glass used in the first lens of this objective is a glass chosen for its low chromatic dispersion or high V-value, and also for its relatively high index of refraction. This combination of properties is novel as used in such a single Gaussian system and reduces the chromatic aberration and zonal spherical aberration.

The objective assembly is followed by a pair of field lenses which are properly chosen so as to not further increase distortion substantially, and which also do not produce too great a spherical aberration of the stop.

The first erector assembly which follows the field lenses is quite novel and is of the double Gauss type with preferably seven elements, including a first lens which is convex-concave, a second lens which is convex-concave, a third lens which is convex-concave, a fourth lens which is concave-concave, a fifth lens which is convex-convex, a sixth lens which is convex-concave, and a seventh lens which is convex-convex. The character of the glass utilized in these seven lens elements is different from the prior art. Likewise, the radius of the second surface of the third element in proportion to F is exceedingly short. In addition, the apertures of the first and last elements are large in proportion to the simple relative aperture of the complete lens. Likewise, the apertures of the elements are increasingly larger as they recede from the stop. Correction of distortion is accomplished principally by the last element working in conjunction with the basic shape of the following reticle aspheric lens. In addition, all major aberrations are re-corrected in this first erector assembly.

The next element in the system, namely, the reticle aspheric field lens, is used to direct the bundles of light which come from the first erector into the second erector. In this system it is necessary to correct, or at least control, the spherical aberration of the stop each time an image of the original object is formed. Such an image is formed four times in the present system, with the fourth image being formed at the eye lens and being viewed directly by the eyes of the observer. The particular shape of the second surface of this reticle aspheric field lens, therefore, again corrects the spherical aberration of the stop while the general shape of the lens, as well as the aspheric surface thereof, corrects the distortion in the image resulting from the first erector and objective.

The second erector is the next lens assembly in the system and is also a novel component comprising two sets of juxtaposed, identical, three lens elements. The use of duplicate sets in the lens system automatically corrects for coma and distortion and doubles the speed. Although the function of this erector is only to relay or reimage the object, it is very well corrected for spherical aberration of the image, chromatic aberration, field curvature, coma, distortion and astigmatism. A double Gauss system of this type is believed to be novel and no such system has previously been designed which approaches the performance of this relay lens.

Referring now to the drawing and particularly to FIGURE 1 thereof, the narrow angle objective is designated generally by the numeral 10 and the pair of field lenses forming the next element in the assembly are designated generally by the numeral 12. In FIGURE 2, the first lens 14 of the objective assembly is more clearly shown to be meniscus shaped, with the first surface thereof concave. The radius of curvature of such first surface may be equal to between .3 and .4 times the focal length of the objective assembly. The second surface of lens 14 is convex and the radius of curvature thereof may be equal to between .35 and .45 times the focal length of the objective assembly. The thickness of this first lens may be between .12 and .16 times the focal length of the objective assembly and it may be made of glass with an index of refraction greater than 1.6.

As previously stated, this first lens 14 of the objective assembly is concave-convex; the seconds lens 16 is convex-convex; and the third lens 18 is concave-convex. The data for one embodiment of this assembly is given in the following table:

*Table 1*
Objective assembly  EF=215.57 mm.  PTZ=+.002264

| Lens | Radii | Thicknesses | Diameters | $n_d$ | $\nu$ |
|---|---|---|---|---|---|
| I | $R_1=-74.3$ | $T_{1-2}=29.7$ | $D_{1-2}=85$ | 1.620 | 60.0 |
| | $R_2=-88.6$ | $S_{2-3}=.19$ | | | |
| | $R_3=+260.0$ | | | | |
| II | $R_4=-72.56$ | $T_{3-4}=18.6$ | $D_{3-4}=85.0$ | 1.517 | 64.5 |
| III | $R_5=-156.65$ | $T_{4-5}=4.6$ | $D_{4-5}=85.0$ | 1.649 | 33.8 |
| | | $S_{5-6}=228.5$ | | | |

The two field lenses 20 and 22 follow the objective assembly and, as previously stated, are chosen so as to not further increase distortion substantially and to not produce too great a spherical aberration of the stop. One embodiment of these lenses is given in the following table:

*Table 2*
[Field lenses]

| Lens | Radii | Thicknesses | Diameters | $n_d$ | $\nu$ |
|---|---|---|---|---|---|
| I | $R_6=\infty$ | $T_{6-7}=15.0$ | $D_{6-7}=118.8$ | 1.517 | 64.5 |
| | $R_7=-159.36$ | $S_{7-8}=.3$ | | | |
| II | $R_8=+159.36$ | $T_{8-9}=15.0$ | $D_{8-9}=118.0$ | 1.517 | 64.5 |
| | $R_9=\infty$ | $S_{9-10}=181.2$ | | | |

The values given in the above two tables and those following represent preferred embodiments of the elements although as indicated above other values also could be used. For example, all radii could vary by an amount such that the absolute value of their reciprocal would vary by ±.005, as long as technical compensations were made. The thicknesses could similarly vary by an amount of ±1.5 and the air spaces could vary by a factor 3 or 4 to 1. The index of the glass in each instance could vary by ±.004 and the reciprocal dispersion factor or V-value by ±1.0.

The first erector assembly, indicated generally by the numeral 24 and shown in detail in FIGURE 3, as previously stated, is of the double Gauss type and comprises at least seven elements. These are the convex-concave first lens 26, the convex-concave second lens 28, the convex-concave third lens 30, the concave-concave fourth lens 32, the convex-convex fifth lens 34, the convex-concave sixth lens 36, and the convex-convex seventh lens 38. Lens 38 may be made of glass having an index greater than 1.63 and a thickness between .22 times and .27 times the focal length of the erector assembly. The first surface of the lens 38 may have a radius of curvature between .7 and .9 times the focal length of the erector assembly and the second surface of the lens 38 may have a radius of curvature between .85 times and 1.0 times the focal length of the erector.

The following tables gives the data regarding a preferred embodiment of this first erector assembly:

*Table 3*
[First erector assembly  EF=92.702  PTZ=-.000822]

| Lens | Radii | Thicknesses | Diameters | $n_d$ | $\nu$ |
|---|---|---|---|---|---|
| I | $R_{10}=+77.56$ | $T_{10-11}=10.7$ | $D_{10-11}=68.0$ | 1.651 | 55.8 |
| | $R_{11}=+297.95$ | $S_{11-12}=1.4$ | | | |
| II | $R_{12}=+31.23$ | $T_{12-13}=14.3$ | $D_{12-13}=56.0$ | 1.620 | 60.0 |
| III | $R_{13}=+88.45$ | $T_{13-14}=4.6$ | $D_{13-14}=56.0$ | 1.576 | 41.3 |
| | $R_{14}=+19.73$ | $S_{14-15}=17.4$ | | | |
| IV | $R_{15}=-25.46$ | $T_{15-16}=4.6$ | $D_{15-16}=56.0$ | 1.673 | 32.2 |
| V | $R_{16}=+94.97$ | $T_{16-17}=19.4$ | $D_{16-17}=56.0$ | 1.651 | 55.8 |
| | $R_{17}=-38.46$ | $S_{17-18}=.88$ | | | |
| VI | $R_{18}=+133.11$ | $T_{18-19}=2.5$ | $D_{18-19}=77.5$ | 1.649 | 33.8 |
| VII | $R_{19}=+74.0$ | $T_{19-20}=22.3$ | $D_{19-20}=77.5$ | 1.651 | 55.8 |
| | $R_{20}=-86.69$ | $S_{20-21}=100.8$ | | | |

The next element, the reticle aspheric field lens 37 is used to direct the bundles of light which come from the first erector assembly 24 into the second erector assembly indicated generally by the numeral 40. The field lens 37 has a double function in that it is used to correct the spherical aberration of the stop and to correct the distortion in the image resulting from the first erector assembly 24.

This lens has a first surface $R_{21}$ which may have a radius equal to between 60 and 70. The second surface $R_{22}$ of this lens is aspheric and the equation for this surface is as follows:

$$**X = +a \times 10^{-3}Y^2 - b \times 10^{-6}Y^3 - c \times 10^{-6}Y^4 - d \times 10^{-9}Y^5$$

where $a$, $b$, $c$ and $d$ may have the following range of values:

| a | b | c | d |
| --- | --- | --- | --- |
| 3.0–3.6 | 20.0–23.0 | 1.0–1.5 | 1.0–1.2 |

This lens may also be defined as a double convex aspheric field lens in which the first surface is spherical and convex and the second surface is aspherical and convex, and in which the vertex radius of curvature of the aspheric surface is between 2 times and 2.5 times the radius of curvature of the first surface, and in which the aspheric surface departs from a spherical surface by at least .07 times the radius of curvature of the first surface at a point removed from the axis of the aspheric a distance of .47 times the radius of curvature of the first surface.

Data with respect to a preferred construction of this reticle aspheric lens 36 is shown in the following table:

Table 4

| Lens | Radii | Thicknesses | Diameters | $n_d$ | $\nu$ |
| --- | --- | --- | --- | --- | --- |
| I | $R_{21}=+71.52$ $R_{22}=**$ | $T_{21-22}=11.7$ $S_{22-23}=1.5$ | $D_{21-22}=61.89$ | 1.517 | 64.5 |

A suitable reticle 39, having two flat faces $R_{23}$ and $R_{24}$, is disposed in close association with the surface of the lens 36 farthest removed from the first erector 34. The remaining data with respect to the preferred construction of this reticle 39 is shown in the following table:

Table 5

| Lens | Radii | Thickness | Diameters | $n_d$ | $\nu$ |
| --- | --- | --- | --- | --- | --- |
| I | $R_{23}=\infty$ $R_{24}=\infty$ | $T_{23-24}=2.54$ $S_{24-25}=197.67$ | $D_{23-24}=127.0$ | 1.520 | 58.5 |

This reticle is followed by a second erector assembly indicated generally by the numeral 40 having a pair of juxtaposed, thick, double meniscus components 42 and 44 disposed between two pairs of positive components 46 and 48 and 50 and 52. The following table gives the constructional details of this assembly 40, together with the data for the field lens 54 which is disposed between the second erector assembly 40 and the beam splitting cube 56. The data for lens 54 and cube 56 is shown in Tables 7 and 8.

Table 6

[Second erector assembly    EF=179.98    PTZ=0.0015]

| Lens | Radii | Thicknesses | Diameters | $n_d$ | $\nu$ |
| --- | --- | --- | --- | --- | --- |
| I | $R_{25}=-199.32$ $R_{26}=-129.79$ | $T_{25-26}=10.59$ $S_{26-27}=1.06$ | $D_{25-26}=98.0$ | 1.620 | 60.0 |
| II | $R_{27}=+156.87$ $R_{28}=-919.08$ | $T_{27-28}=18.0$ $S_{28-29}=1.8$ | $D_{27-28}=98.0$ | 1.620 | 60.0 |
| III | $R_{29}=+91.93$ $R_{30}=-99.34$ | $T_{29-30}=50.84$ | $D_{29-30}=92.6$ | 1.620 | 60.0 |
| IV | $R_{31}=+52.28$ | $T_{30-31}=3.07$ $S_{31-32}=30.6$ | $D_{30-31}=92.6$ | 1.617 | 36.6 |
| V | $R_{32}=-52.28$ $R_{33}=+99.34$ | $T_{32-33}=3.07$ | $D_{32-33}=107.4$ | 1.617 | 36.6 |
| VI | $R_{34}=-91.93$ | $T_{33-34}=50.84$ $S_{34-35}=1.8$ | $D_{33-34}=107.4$ | 1.620 | 60.0 |
| VII | $R_{35}=+919.08$ $R_{36}=-156.87$ | $T_{35-36}=18$ $S_{36-37}=1.06$ | $D_{35-36}=118$ | 1.620 | 60.0 |
| VIII | $R_{37}=+129.79$ $R_{38}=+199.32$ | $T_{37-38}=10.59$ $S_{38-39}=203.35$ | $D_{37-38}=118$ | 1.620 | 60.0 |

Table 7

| Lens | Radii | Thicknesses | Diameters | $n_d$ | $\nu$ |
| --- | --- | --- | --- | --- | --- |
| I | $R_{39}=\infty$ $R_{40}=-95.0$ | $T_{39-40}=8.5$ $S_{40-41}=2.0$ | $D_{39-40}=68$ | 1.517 | 64.5 |

Table 8

| Lens | Radii | Thicknesses | Diameters | $n_d$ | $\nu$ |
| --- | --- | --- | --- | --- | --- |
| I | $R_{41}=\infty$ $R_{42}=\infty$ | $T_{41-42}=80.0$ $S_{42-43}=138.30$ | $D_{41-42}=80$ | 1.517 | 64.5 |

This second erector assembly differs from prior devices in that it has a thick, double meniscus having a strong concave inside surface and two positive elements on the convex side, the entire assembly being composed of two juxtaposed units of this kind with the outermost of said two positive elements in each pair being of meniscus shape with the concave surface thereof furthermost from the convex surface of the thick, double meniscus with which it is associated. As previously mentioned, although the function of this second erector assembly is only to reimage the objective, it is very well corrected for spherical aberration of the image, chromatic aberration, field curvature, coma, distortion and astigmatism. The speed of the particular lens assembly defined is faster than $f:1.3$ while the spherical aberration is less than .01 millimeter.

This second erector can be further defined as an eight-element erector, in which the first four elements are shaped the same as its last four elements, but are arranged in a juxtaposed manner, and further, in which its first element is concave-convex, with its first radius of curvature concave and between 1.0 and 1.2 times the focal length of the complete erector, and in which its second radius of curvature is between .6 and .8 times the focal length of the complete erector, and in which its second element is double convex with its first radius of curvature between .8 and .9 times the focal length of the complete erector, and in which its second radius of curvature is between .5 and .6 times the focal length of the complete second erector, and in which its third element has its first radius of curvature between .4 and .6 times the focal length of the complete erector, and in which its second radius of curvature is between .5 and .6 times the focal length of the complete second erector, and in which its fourth element is double concave with its first radius of curvature between .5 and .6 times the focal length of the complete erector, with its second radius of curvature between .25 and .3 times the focal length of the complete second erector.

The beam splitting cube 56 has a second field lens 57 disposed in association with the lower surface thereof which lens is identical with the lens 54. An illuminated reticle 58 is disposed in association with the lens 57. The purpose of such a reticle is to indicate ground speed or the like.

This assembly is followed by the third erector assembly which is indicated generally by the numeral 59. This assembly is a double Gauss system having two strongly bent double meniscus components, indicated generally by the numerals 60 and 61, having their concave surfaces $R_{47}$ and $R_{48}$ disposed in adjoining relation. The pair of double meniscus components is preceded by a double convex lens 62 and followed by a positive meniscus lens element 63 with the concave surface $R_{51}$ of the latter being disposed adjacent to the convex surface $R_{50}$ of the second double meniscus component. Table 9 gives the constructional details of this assembly:

Table 9

[Third erector assembly  EF=176.53  PTZ=.0016]

| Lens | Radii | Thicknesses | Diameters | $n_d$ | $\nu$ |
|---|---|---|---|---|---|
| I | $R_{43}=+283.74$ $R_{44}=-156.36$ | $T_{43-44}=16.46$ $S_{44-45}=.98$ | $D_{43-44}=98$ | 1.645 | 48.0 |
| II | $R_{45}=+95.34$ $R_{46}=-90.46$ | $T_{45-46}=34.86$ | $D_{45-46}=88.5$ | 1.645 | 48.0 |
| III | $R_{47}=+68.99$ | $T_{46-47}=3.85$ $S_{47-48}=28.78$ | $D_{46-47}=88.5$ | 1.673 | 32.2 |
| IV | $R_{48}=-50.7$ $R_{49}=+2060.4$ | $T_{48-49}=3.85$ | $D_{48-49}=101.0$ | 1.576 | 41.3 |
| V | $R_{50}=-80.28$ | $T_{49-50}=27.11$ $S_{50-51}=.98$ | $D_{49-50}=101.0$ | 1.623 | 57.2 |
| VI | $R_{51}=-219.81$ $R_{52}=-105.38$ | $T_{51-52}=13.58$ $S_{52-53}=494.11$ | $D_{51-52}=111.0$ | 1.645 | 48.0 |

This third erector assembly re-forms the third image into the eye lens assembly indicated generally by the numeral 64. The image so re-formed becomes the fourth image which is seen by the eye 65.

This assembly may also be defined as an erector lens assembly in which the first double convex lens element is made of glass having an index of refraction greater than 1.620 and in which the first radius of curvature of said double convex lens is between 1.5 and 1.7 times the focal length of said erector, and in which the second radius of curvature of said first double convex lens element is between .8 and .9 times the focal length of said erector, and in which the thickness of said first double convex lens element is between .08 and .01 times the focal length of said erector, and in which the last element is made of glass having an index of refraction greater than 1.62, is meniscus shaped, has a first surface which is concave with a radius of curvature of a numerical value of between 1.2 and 1.3 times the focal length of said erector and has a second surface which is convex with a radius of curvature between .5 and .7 times the focal length of said erector.

The eye lens 64 is composed of two positive meniscus elements 66 and 67. The construction of this eye lens assembly is shown in the following table:

Table 10

| Lens | Radii | Thicknesses | Diameters | $n_d$ | $\nu$ |
|---|---|---|---|---|---|
| I | $R_{53}=-2000.0$ $R_{54}=-360.3$ | $T_{53-54}=10.0$ $S_{54-55}=1.0$ | $D_{53-54}=152.4$ | 1.649 | 33.8 |
| II | $R_{55}=+360.3$ $R_{56}=+2000.0$ | $T_{55-56}=10.0$ $S_{56-eye}=743.06$ | $D_{55-56}=152.4$ | 1.649 | 33.8 |

The function of the eye lens assembly is to re-direct the bundles of light toward the eye.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. A periscope type optical system comprising a narrow angle objective assembly, a first erector lens assembly, a reticle aspheric field lens, a second erector lens assembly, a second positive field lens, a third erector lens assembly, and an eye lens assembly in operative axial alignment and airspaced apart wherein: said narrow angle objective assembly comprises a meniscus shaped concave-convex lens, followed by a doublet formed of a first convex-convex lens and a second concave-convex lens, said lens assembly being substantially uncorrected for distortion; said field lens assembly being substantially uncorrected for distortion and spherical aberration of the stop; said first erector lens assembly comprised of seven elements in which the apertures of the first and last lens surfaces are at least 2.3 times as large as the aperture stop; said reticle aspheric field lens being adapted to correct the distortion of the first erector lens assembly and the spherical aberration of the stop, said second erector lens assembly being comprised of a pair of juxtaposed thick double meniscus components having a strong concave inside surface, said pair of meniscus components being disposed between two pairs of positive components, the outermost component in each pair being of meniscus shape with the concave surface thereof furthermost from the convex surface of the thick double meniscus component associated therewith; said third erector lens assembly comprised of a double Gauss system having two strongly bent double meniscus components disposed with their concave surfaces in adjoining relation, said two double meniscus components being preceded by a double convex lens and followed by a positive meniscus lens having the concave surface thereof disposed adjacent to the focused surface of the second double meniscus component; and said eye lens assembly comprised of two positive meniscus components.

2. A periscope type optical system of the character described in claim 1 further characterized in that said objective lens assembly has the constructional data specified in the following table:

Table 1

[Objective assembly  EF=215.57 mm.  PTZ=+.002264]

| Lens | Radii | Thicknesses | Diameters | $n_d$ | $\nu$ |
|---|---|---|---|---|---|
| I | $R_1=-74.3$ $R_2=-88.6$ | $T_{1-2}=29.7$ $S_{2-3}=.19$ | $D_{1-2}=85$ | 1.620 | 60.0 |
| II | $R_3=+260.0$ $R_4=-72.56$ | $T_{3-4}=18.6$ $T_{4-5}=4.6$ | $D_{3-4}=85.0$ $D_{4-5}=85.0$ | 1.517 1.649 | 64.5 33.8 |
| III | $R_5=-156.65$ | $S_{5-6}=228.5$ | | | | where the lens elements are designated by Roman numerals and the radii, thicknesses and air spaces are designated by R, T, and S, respectively, with Arabic numeral subscripts and the refractive index for the D line of the spectrum and the reciprocal dispersion ratio are designated by $n_d$ and $\nu$, respectively, and where the equivalent focal length and Petzval curvature are designated by EF and PTZ, respectively.

3. A periscope type optical system of the character described in claim 1 further characterized in that said first erector lens assembly has the constructional data specified in the following table:

Table 3

[First erector assembly   EF=92.702   PTZ=−.000822]

| Lens | Radii | Thicknesses | Diameters | $n_d$ | $\nu$ |
|---|---|---|---|---|---|
| I | $R_{10}=+77.56$ | $T_{10-11}=10.7$ | $D_{10-11}=68.0$ | 1.651 | 55.8 |
|   | $R_{11}=+297.95$ | $S_{11-12}=1.4$ |   |   |   |
| II | $R_{12}=+31.23$ | $T_{12-13}=14.3$ | $D_{12-13}=56.0$ | 1.620 | 60.0 |
|    | $R_{13}=+88.45$ |   |   |   |   |
| III | $R_{13}=+88.45$ | $T_{13-14}=4.6$ | $D_{13-14}=56.0$ | 1.576 | 41.3 |
|     | $R_{14}=+19.73$ | $S_{14-15}=17.4$ |   |   |   |
| IV | $R_{15}=-25.46$ | $T_{15-16}=4.6$ | $D_{15-16}=56.0$ | 1.673 | 32.2 |
|    | $R_{16}=+94.97$ |   |   |   |   |
| V | $R_{16}=+94.97$ | $T_{16-17}=19.4$ | $D_{16-17}=56.0$ | 1.651 | 55.8 |
|   | $R_{17}=-38.46$ | $S_{17-18}=.88$ |   |   |   |
| VI | $R_{18}=+133.11$ | $T_{18-19}=2.5$ | $D_{18-19}=77.5$ | 1.649 | 33.8 |
|    | $R_{19}=+74.0$ |   |   |   |   |
| VII | $R_{19}=+74.0$ | $T_{19-20}=22.3$ | $D_{19-20}=77.5$ | 1.651 | 55.8 |
|     | $R_{20}=-86.69$ | $S_{20-21}=100.8$ |   |   |   | where the lens elements are designated by Roman numerals and the radii, thicknesses and air spaces are designated by R, T, and S, respectively, with Arabic numeral subscripts and the refractive index for the D line of the spectrum and the reciprocal dispersion ratio are designated by $n_d$ and $\nu$, respectively, and where the equivalent focal length and Petzval curvature are designated by EF and PTZ, respectively.

4. A periscope type optical system of the character described in claim 1 further characterized in that said second erector lens assembly has the constructional data specified in the following table:

Table 6

[Second erector assembly   EF=179.98   PTZ=.0015]

| Lens | Radii | Thicknesses | Diameters | $n_d$ | $\nu$ |
|---|---|---|---|---|---|
| I | $R_{25}=-199.32$ | $T_{25-26}=10.59$ | $D_{25-26}=98.0$ | 1.620 | 60.0 |
|   | $R_{26}=-129.79$ | $S_{26-27}=1.06$ |   |   |   |
| II | $R_{27}=+156.87$ | $T_{27-28}=18.0$ | $D_{27-28}=98.0$ | 1.620 | 60.0 |
|    | $R_{28}=-919.08$ | $S_{28-29}=1.8$ |   |   |   |
| III | $R_{29}=+91.93$ | $T_{29-30}=50.84$ | $D_{29-30}=92.6$ | 1.620 | 60.0 |
|     | $R_{30}=-99.34$ |   |   |   |   |
| IV | $R_{31}=+52.28$ | $T_{30-31}=3.07$ | $D_{30-31}=92.6$ | 1.617 | 36.6 |
|    | $R_{32}=-52.28$ | $S_{31-32}=30.6$ |   |   |   |
| V | $R_{32}=-52.28$ | $T_{32-33}=3.07$ | $D_{32-33}=107.4$ | 1.617 | 36.6 |
|   | $R_{33}=+99.34$ |   |   |   |   |
| VI | $R_{33}=+99.34$ | $T_{33-34}=50.84$ | $D_{33-34}=107.4$ | 1.620 | 60.0 |
|    | $R_{34}=-91.93$ | $S_{34-35}=1.8$ |   |   |   |
| VII | $R_{35}=+919.08$ | $T_{35-36}=18$ | $D_{35-36}=118$ | 1.620 | 60.0 |
|     | $R_{36}=-156.87$ | $S_{36-37}=1.06$ |   |   |   |
| VIII | $R_{37}=+129.79$ | $T_{37-38}=10.59$ | $D_{37-38}=118$ | 1.620 | 60.0 |
|      | $R_{38}=+199.32$ | $S_{38-39}=203.35$ |   |   |   | where the lens elements are designated by Roman numerals and the radii, thicknesses and air spaces are designated by R, T, and S, respectively, with Arabic numeral subscripts and the refractive index for the D line of the spectrum and the reciprocal dispersion ratio are designated by $n_d$ and $\nu$, respectively, and where the equivalent focal length and Petzval curvature are designated by EF and PTZ, respectively.

5. A periscope type optical system of the character described in claim 1 further characterized in that said eye lens has the constructional data specified in the following table:

Table 10

| Lens | Radii | Thicknesses | Diameters | $n_d$ | $\nu$ |
|---|---|---|---|---|---|
| I | $R_{53}=-2000.0$ | $T_{53-54}=10.0$ | $D_{53-54}=152.4$ | 1.649 | 33.8 |
|   | $R_{54}=-360.3$ | $S_{54-55}=1.0$ |   |   |   |
| II | $R_{55}=+360.3$ | $T_{55-56}=10.0$ | $D_{55-56}=152.4$ | 1.649 | 33.8 |
|    | $R_{56}=+2000.0$ | $S_{56-eye}=743.06$ |   |   |   | where the lens elements are designated by Roman numerals and the radii, thicknesses and air spaces are designated by R, T, and S, respectively, with Arabic numeral subscripts and the refractive index for the D line of the spectrum and the reciprocal dispersion ratio are designated by $n_d$ and $\nu$, respectively.

6. In a periscope type optical system a single Gaussian objective lens assembly comprising at least first, second, and third lens elements, and constructed so as to receive substantially parallel light: and in which said first element is meniscus shaped and has a concave first surface having a radius of curvature between .3 and .4 times the focal length of said objective lens assembly and a convex second surface having a radius of curvature between .35 and .45 times the focal length of said objective lens assembly; and in which said second element has a convex first surface having a radius of curvature between 1.1 and 1.3 times the focal length of said objective lens assembly, and a convex second surface having a radius of curvature between .32 and .36 times the focal length of said objective lens assembly; and in which said third lens element has a concave first surface having a radius of curvature substantially numerically equal to the radius of curvature of the second surface of said second lens element and a convex second surface having a radius of curvature between .7 and .75 times the focal length of said objective lens assembly; and in which the indices of refraction of said elements are between 1.610 and 1.630 for said first lens element, between 1.513 and 1.521 for said second lens element, and between 1.645 and 1.653 for said third lens element.

7. A lens system comprising at least four components in which: the first component is convex-concave and has first and second radii of .84 and 3.2, respectively, times the effective focal length of the system; the second component is meniscus and has first and second radii of .34 and .21, respectively, times the effective focal length; the third component is meniscus in shape and has first and second radii of .27 and .41, respectively, times the effective focal length of the lens assembly system; and the fourth component is double convex and is composed of at least two elements in which the first element has a convex first surface having a radius of curvature between 1.3 and 1.5 times the focal length of the lens system and a concave second surface having a radius of curvature between .7 and .9 times said focal length and an index of refraction between 1.645 and 1.653 and in which the second lens element has a convex first surface numerically equal to the second surface of said first lens element and a convex second surface having a radius of curvature between .85 and 1.0 times the focal length of said lens assembly and an index of refraction between 1.647 and 1.655.

8. A lens system comprising at least four components in which: the first component is convex-concave and has first and second radii of .84 and 3.2, respectively, times the effective focal length of said system; the second component is meniscus and has first and second radii of .34 and .21, respectively, times the effective focal length of said system; the third component is meniscus in shape and has first and second radii of .27 and .41, respectively, times the effective focal length of said system; and the fourth component is double convex and is composed of at least two elements in which the first element has a convex first surface having a radius of curvature between 1.3 and 1.5 times the focal length of the lens system and a concave second surface having a radius for curvature between .7 and .9 times said focal length and an index of refraction between 1.645 and 1.653 and in which the second lens element has a convex first surface numerically equal to the second surface of said first lens element and a convex second surface having a radius of curvature between .85 and 1.0 times the focal length of said lens assembly and an index of refraction that is substantially .002 higher than the index of refraction of said first element.

References Cited in the file of this patent

UNITED STATES PATENTS

| | | |
|---|---|---|
| 934,579 | Straubel et al. | Sept. 21, 1909 |
| 1,786,916 | Merte | Dec. 30, 1930 |
| 2,206,155 | Boegehold | July 2, 1940 |
| 2,252,681 | Aklin | Aug. 19, 1941 |
| 2,398,276 | Altman | Apr. 9, 1946 |
| 2,453,336 | Orser | Nov. 9, 1948 |
| 2,481,639 | Altman et al. | Sept. 13, 1949 |
| 2,510,419 | Ross | June 6, 1950 |
| 2,614,461 | Warmisham | Oct. 21, 1952 |
| 2,719,457 | Tripp | Oct. 4, 1955 |

FOREIGN PATENTS

| | | |
|---|---|---|
| 924,539 | Germany | Mar. 3, 1955 |